F. L. STANTON.
SYSTEM OF DENTAL CHARTS AND METHOD OF MAKING THE SAME.
APPLICATION FILED FEB. 4, 1916.
1,293,567.
Patented Feb. 4, 1919.
5 SHEETS—SHEET 1.
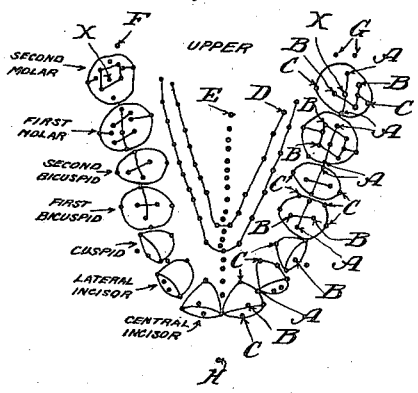
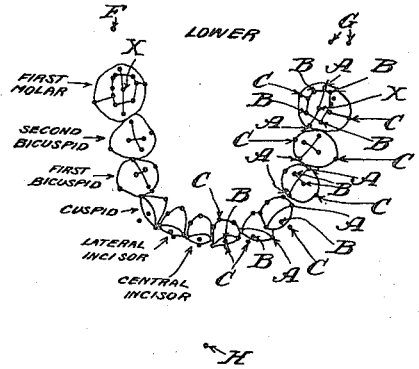
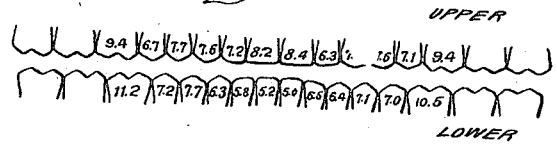
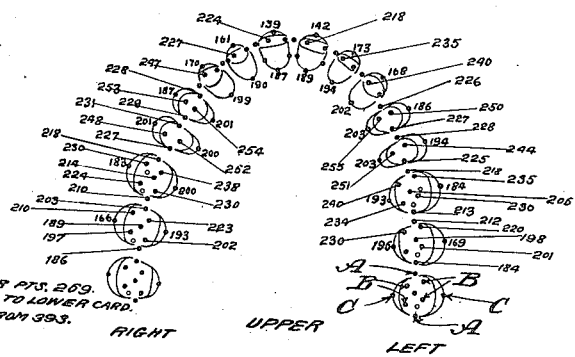
INVENTOR
FREDERICK LESTER STANTON
WITNESSES:

F. L. STANTON.
SYSTEM OF DENTAL CHARTS AND METHOD OF MAKING THE SAME.
APPLICATION FILED FEB. 4, 1916.
1,293,567.
Patented Feb. 4, 1919.
5 SHEETS—SHEET 2.
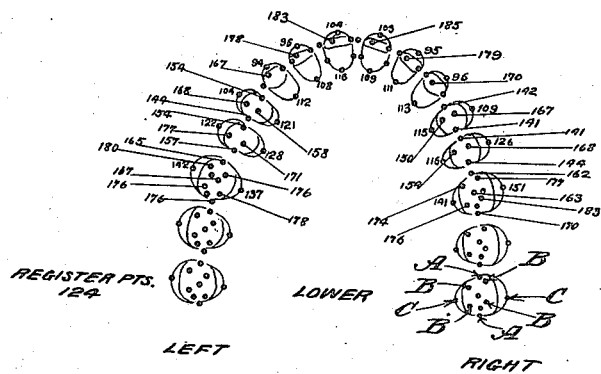
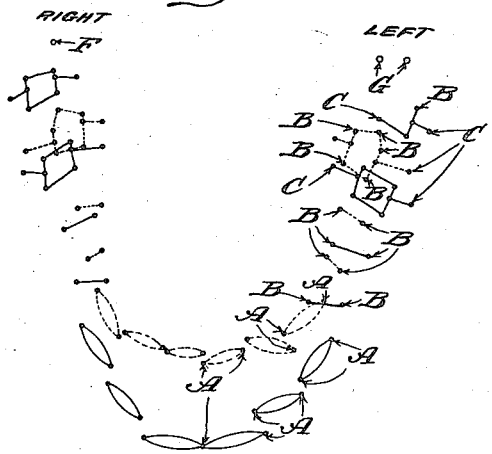
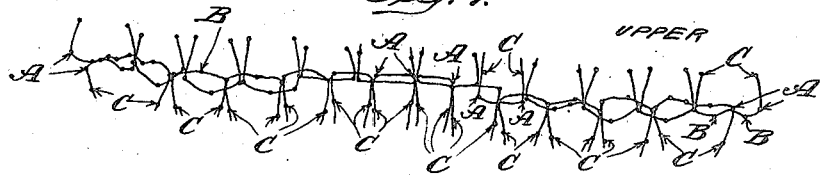
WITNESSES:
INVENTOR
FREDERICK LESTER STANTON
BY
ATTORNEY F. L. STANTON.
SYSTEM OF DENTAL CHARTS AND METHOD OF MAKING THE SAME.
APPLICATION FILED FEB. 4, 1916.

1,293,567.

Patented Feb. 4, 1919.
5 SHEETS—SHEET 3.

UPPER

LOWER

WITNESSES:

INVENTOR
FREDERICK LESTER STANTON

ATTORNEY

F. L. STANTON.
SYSTEM OF DENTAL CHARTS AND METHOD OF MAKING THE SAME.
APPLICATION FILED FEB. 4, 1916.

1,293,567.

Patented Feb. 4, 1919.
5 SHEETS—SHEET 4.

WITNESSES:

INVENTOR
FREDERICK LESTER STANTON
BY
ATTORNEY

F. L. STANTON.
SYSTEM OF DENTAL CHARTS AND METHOD OF MAKING THE SAME.
APPLICATION FILED FEB. 4, 1916.

1,293,567.

Patented Feb. 4, 1919.

WITNESSES:

INVENTOR
FREDERICK LESTER STANTON
BY
ATTORNEY

UNITED STATES PATENT OFFICE.

FREDERICK LESTER STANTON, OF NEW YORK, N. Y.

SYSTEM OF DENTAL CHARTS AND METHOD OF MAKING THE SAME.

1,293,567.　　　　　Specification of Letters Patent.　　Patented Feb. 4, 1919.

Application filed February 4, 1916. Serial No. 76,144.

*To all whom it may concern:*

Be it known that I, FREDERICK LESTER STANTON, a citizen of the United States, and a resident of the city, county, and State of New York, (whose post-office address is 28 West 39th Street, New York city,) have invented Systems of Dental Charts and Methods of Making the Same, of which the following is a specification.

The object of my invention is to make and assemble a set of charts which will show a set of human teeth as they are, as they ought to be, and what minimum changes should be made, if any, to put them in occlusion, or as nearly in occlusion, as they can be placed. This object is accomplished by my invention, as will appear below, where will be found an exact description of an actual case.

In the practice of my invention it is desirable to use two instruments which are shown, described and claimed in patents, one to Rudolph L. Hanau, No. 1,230,156, June 19, 1917, for a dental surveying apparatus, and another to Gilbert Dudley Fish, No. 1,246,408, Nov. 13, 1917, for an instrument for determining the correct location of teeth or occlusograph.

For a more particular description of my invention, reference is to be had to the accompanying drawings, forming a part hereof, in which—

Figure 1 is a horizontal projection of cusps and other points of an upper jaw as taken from a casting.

Fig. 2 is a similar view of a lower jaw.

Fig. 3 is a chart giving the mesio-distal diameters of the respective teeth as determined by measurement and recorded in millimeters. Teeth without such a record are disregarded.

Figs. 4 and 5 are elevation charts of the upper and lower teeth showing elevations from given planes in small units, say in tenths of a millimeter.

Figure 8:
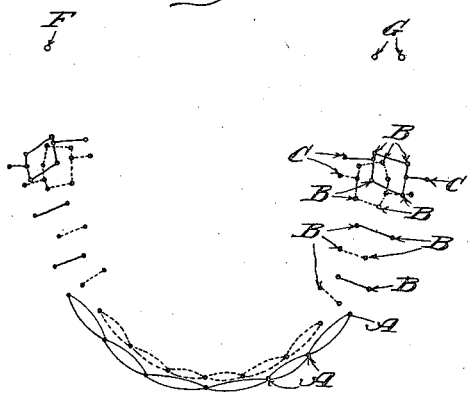
Figure 9:
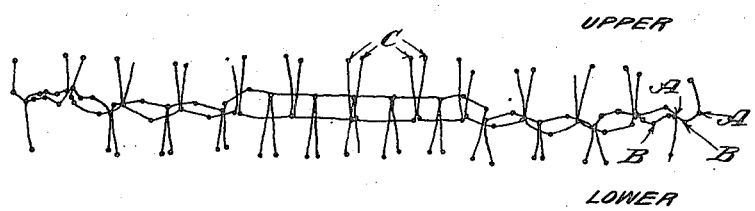
Figure 10:
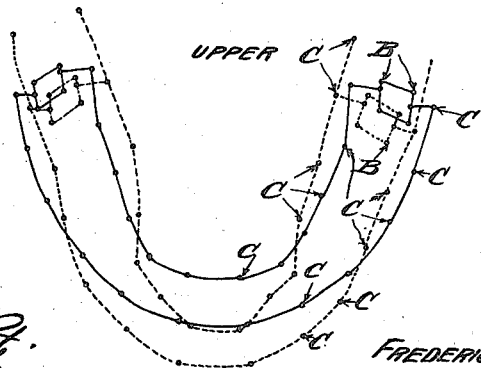
Figure 11:
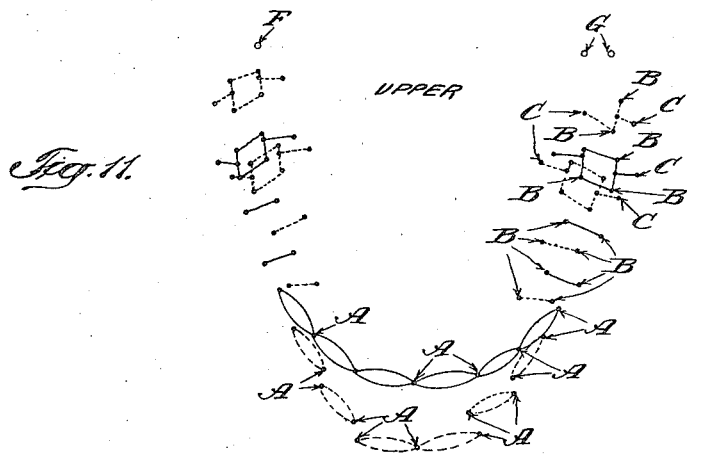
Figure 12:
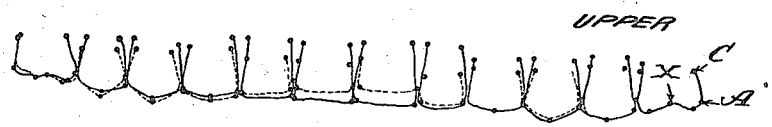
Figure 13:
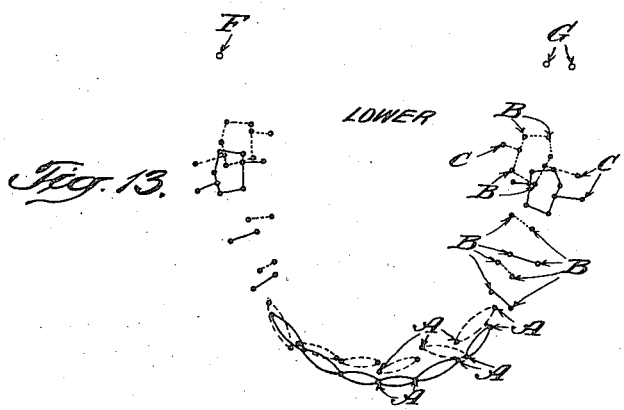
Figure 14:
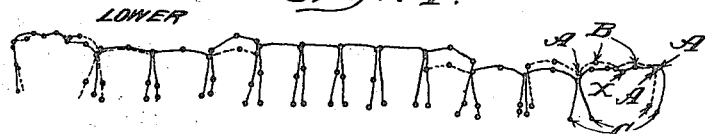
Figure 15:
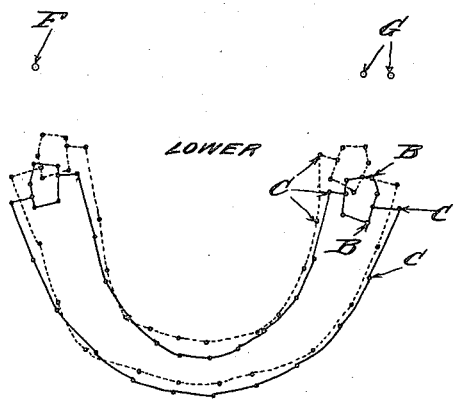

Figs. 6 to 15 are charts made to scale, showing the teeth of both jaws in plan, the lower jaw being shown in dotted lines; Fig. 7 is a development in elevation or profile, in each instance the teeth are shown in malocclusion; Figs. 8 and 9 being views corresponding to Figs. 6 and 7 showing the teeth in occlusion; Fig. 10 shows the upper gum lines, the normal position being shown in full and the abnormal in dotted lines; Figs. 11 and 12 show the upper teeth in occlusal positions in full lines and malocclusal positions in dotted lines, the former being a plan view and the latter a profile; Figs. 13 and 14 are corresponding views of the lower teeth, Fig. 13 corresponding to Fig. 11 and Fig. 14 to Fig. 12; and Fig. 15 is a view of the lower gum lines corresponding to Fig. 10.

Figure 16:
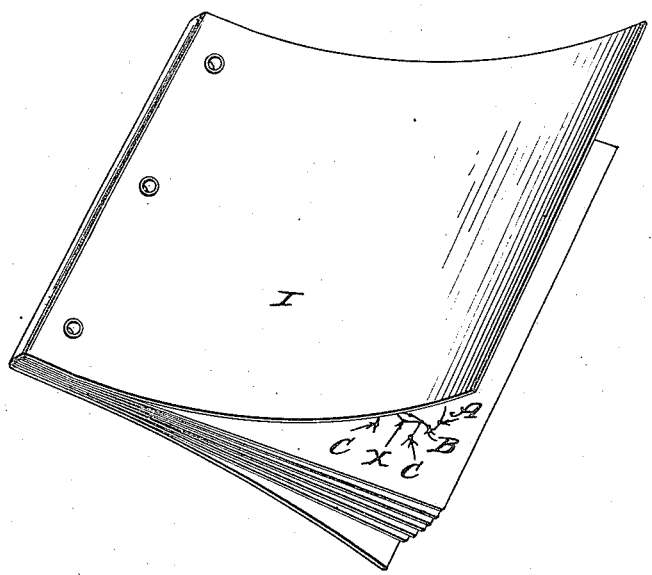

Fig. 16 is a book, full size, of assembled charts, shown in Figs. 6 to 15 inclusive, the charts being placed in the order given, and with the rear dots at the right and left of each last tooth or molar in registration. For convenience, one such dot represents the right side and two the left.

Throughout the various views of the drawings, similar reference characters designate similar parts.

As it is difficult or impossible to make accurate surveys of the teeth in the mouth of a patient, it is best to make accurate castings which may be made in any suitable way, as for example, the one described in "*Treatment of Malocclusion of the Teeth*," by Angle, page 144, chapter 8, entitled "Models."

Such castings, one of each jaw, are surveyed by use of said surveying instrument, or otherwise, so as to determine the exact and relative positions of the teeth both as to horizontal planes and as to elevations therefrom of points which give the mesio-distal diameters of the teeth; the cusps of the teeth and the medial points of emergence, both buccal and lingual, of these teeth from the gums. To avoid confusion these points are taken in different colors, say the first class in green, the second in red and the third in yellow, different colored carbons being used in the surveying instrument, one color at a time, to effect this purpose.

In Fig. 1 are shown these three classes of points, and also an extra line showing the median suture of the palate and two contour lines of the palate. The dots indicating points of emergence of the molars and bicuspids from the gums, the front and rear contact points, have been joined so as to distinguish one tooth from another. The front teeth are distinguished by drawing similar lines which omit the outer gum points. The points indicating the mesio-distal diameters are indicated by the reference character A, the cusps by the letter B, the point of emergence of the teeth from the gums by the character C, and fossæ points by the character X. To avoid confusion, in the drawings, only some of these characters are applied. D indicates the palate lines and E a medial line going through the upper jaw. The teeth here indicated are the central incisors, lateral incisors, cuspids, first bi-cuspids, second bi-cuspids, first molars and second molars.

At the rear of the right second molar is placed a single dot F, and at the left two dots G, close together, and at the front a single dot H. The dots F and G indicate right and left respectively, as above explained, and all dots F, G and H are used so as to facilitate registration of the diagrams when superimposed one upon another.

Fig. 2 is a view of the lower teeth which corresponds to Fig. 1, the same terminology being employed, so that the same reference characters are used. It will be noted that in this set of teeth there are no second molars.

In Fig. 3 is shown a development of a set of teeth complete, which is a mere printed form with convenient spaces for indicating the mesio-distal diameters of all the teeth it is necessary to measure. These diameters are taken from the castings and recorded as shown. As the second molar of the upper jaw engages no corresponding tooth in the lower jaw, and is idle, it is ignored and left out of consideration.

Fig. 4 is a diagram of upper teeth, somewhat enlarged, and not anything more than a form on which it is easy to locate the elevation of the classes of points referred to above when considering Fig. 1. These elevation points are determined in the instrument in a manner which will now be described.

The elevation numbers are obtained by first placing the casting of the upper jaw nearly true in the surveying instrument and a suitable sheet of thin paper is placed in the surveying instrument, and under its fixed horizontal surface, where it is stretched tight and held, as described in the said Hanau application. When in such position, a carbon is placed under it, of a green color, and then the points A indicating the mesio-distal diameters are made with the surveying instrument, and also the fossæ points X. After these points have been determined, the green carbon is removed and a red one is substituted, and then the points B indicating the cusps are mapped, after which the red carbon is removed and a yellow substituted, and then the points C of emergence of the teeth are indicated on the sheet of paper by yellow dots and the palate suture and palate contour points are mapped. Any other points of interest may also be mapped.

The elevation numbers are determined and recorded as shown in Fig. 4.

Before removing the model of the upper jaw and chart from the surveying instrument, the model of the lower jaw is placed in correct relation with the upper model, at which time both models are inverted, and with the surveying instrument set at a convenient level, say 269, three marks are then made on the lower jaw model and their projections registered on the upper map, one F, being placed at the rear of the last right molar, one double mark G, being placed at the rear of the last left molar, and one H, in front. As the points on the casting of the lower jaw, to which these points F, G and H refer, are all in the same plane, after the removal of these castings and the placing of the lower jaw casting in the instrument, it may be leveled by these marks thereon at any convenient level, say 124. The thin paper, upper chart, made as shown in Fig. 1, except for the lines, is then removed and a thick paper substituted with a green carbon on each side.

The registration points F, G and H are then mapped and then the other tooth points are mapped, as above described, and the elevations recorded on the elevation card reproduced as Fig. 5.

When making the charts shown in Figs. 1 and 2, care should be taken to make the lines of one on the bur side and the other on the smooth side, say the marks should be made on the bur side of the chart of the lower jaw.

From the data thus obtained it is easy to plot the teeth of both jaws, as shown in Fig. 6 where the positions of the incisors and cuspids are indicated by the mesio-distal diameter points, and the bi-cuspids by the cusp points and the molars by the points of emergence and cusp points, as well as the points indicating the location of the buccal and lingual grooves. From the same data it is possible to plot the teeth in profile, as shown in Fig. 7, in which they are indicated as developed in substantially one plane, showing their relative heights. Figs. 6 and 7 show the teeth as they appear in the castings, and not as they ought to be, and the problem solved by my invention is to show them as they ought to be, as well as they are, so that whatever changes that must be made to bring the teeth in proper occlusal relations, will be indicated in the charts.

In Fig. 8 are shown the teeth of the jaws in proper occlusal relation one with another, this being shown as to the upper jaw in full lines, and in dotted lines are shown the corresponding teeth as they should appear in the lower jaw. The correct location of the teeth is determined, as set forth in said Fish application, and when so determined is charted as shown in this figure.

In Fig. 9 is shown a profile of the teeth of these jaws as they ought to be, and this figure is needed only in extreme cases. When needed, it is prepared by first laying off on a straight line the mesio-distal diameters of the teeth, preferably with an enlargement of tenfold, and then erecting the normal profile of each tooth thereon from the data obtained, as above stated. The teeth are placed as follows: On the upper jaw from the contact point from the center incisors to the contact point of the second bi-cuspid and first molar, the teeth are placed on one level as to the contact points, and the molars are placed with a slight upward curvature. The lower incisors are allowed to lap the upper incisors about one-third the height of the upper teeth and the distance the lower bi-cuspids and molars pass the upper teeth is determined by the length of the cusps and the depth of the fossæ in which they occlude. Fig. 8 shows the teeth as they should appear and by sliding the normal charts, Figs. 8 and 9, which are made on translucent paper or linen, over charts, Figs. 6 and 7, until a position is found that brings the corresponding teeth contained in Figs. 8 and 9 nearest to the positions they occupy in Figs. 6 and 7, and then the registration points F and G may be located for Figs. 8 and 9, and then by means of the pantograph, the crooked upper teeth shown in Fig 6 are transferred to Fig. 11 and recorded in dotted lines and from Fig. 8, the upper teeth are similarly taken and recorded in Fig. 11 in full lines. Fig. 11 then shows the minimum horizontal movement of the crooked teeth to produce occlusion. Fig. 13 is produced for the lower jaw in a similar manner and the profiles shown in Figs. 12 and 14 are produced in a similar manner from Figs. 7 and 9, thus indicating the minimum vertical changes necessary to produce occlusion.

In Figs. 10 and 15 the gum lines are shown, the dotted lines indicating the points as determined by the survey and the full lines the correct positions, derived from Figs. 11 and 13 respectively, as well as Figs. 1 and 2.

After all figures shown in Figs. 6 to 15 inclusive have been reduced to actual size and placed on tracing linen or translucent paper, they are bound between covers I, in the order given, as shown in Fig. 16, and then it is possible to compare superimposed views. To insure correct registration the points F and G are placed in alinement by pins passed therethrough and Figs. 6 and 7 are placed on the same sheet, which is also true of Figs. 8 and 9; 11 and 12 and 13 and 14. Figs. 12 and 14 are so spaced with regard to the dots F and G that when superimposed, one on the other, the proper occlusal relations are indicated.

When assembled, as above described, these charts automatically indicate the proper occlusal relations of the teeth, in both plan and profile, and the minimum changes required to produce such relations.

From the information given in these charts, dentists can apply pressure to teeth and gums by well known appliances and fit the appliances from these charts with certainty and accuracy and without guessing. Even when proper occlusal relations cannot be obtained, due to disharmonies in both sizes or form or other causes, the nearest approach to proper occlusal relations may be determined from the charts so that experiments with the patient's mouth are unnecessary. Another result obtained by these charts is the certainty of operation which reduces the number of treatments and the duration of treatments. A further advantage is that the dentist treating a given case may have the charts made for him at a special place, equipped for the purpose by specialists.

What I claim is:

1. A method of making dental charts which consists in plotting a set of teeth as they are and also in plotting these teeth as this observed data shows they ought to be, and in placing these plots so that one may be directly compared with the other so as to determine what movement of each tooth must be made, if any, to place it in its true occlusal position.

2. A method of making dental charts which consists in first surveying the teeth of a patient to determine as to each tooth, its cusps, contact and gum lines in their actual inter-relations to one another and to the corresponding parts of the other teeth, and then plotting a horizontal projection of the teeth located as thus determined and then making another chart of the same teeth in correct position, one chart being transparent, and then superimposing the transparent chart upon the other and making a single chart therefrom, which shows the teeth in incorrect and correct positions relative to each other.

3. A method of making dental charts which consists in first surveying the teeth of each jaw, then from the data thus obtained plotting a horizontal projection of the teeth of each jaw located as thus determined, then making from the data thus obtained a correct diagram of the teeth of each jaw showing the teeth in correct positions, and then superimposing the diagrams, one on the other, and making a single diagram showing the teeth in incorrect and correct positions.

4. A method of making dental charts which consists in first surveying the teeth, then plotting the same with the teeth of both jaws on one sheet located as thus determined, then from the data thus obtained plotting the teeth in correct relation, on a second sheet, and finally, superimposing the charts one on another so as to show the teeth of each jaw in malocclusion and occlusion.

5. A dental chart showing the modified gum lines of a person as predetermined from the actual observed data.

6. A dental chart showing the teeth of a jaw of a person as they occur, and also in their true occlusal positions, as predetermined from the actual observed data.

7. A dental chart showing the teeth of a jaw of a person in their correct occlusal positions, as predetermined from the actual observed data.

8. A book having translucent pages with charts thereon showing teeth and gums in positions as they are, and in the positions as they ought to be, as predetermined from the actual observed data, the order being as follows, the teeth showing on the first chart being in mal-occlusion, on the second in occlusion; on the third the gum lines for one jaw as they are and as they ought to be, in the fourth the teeth for the same jaw as they ought to be, in the fifth the teeth of the other jaw in the positions in which they are and in the positions in which they ought to be, and in the sixth the gum lines of the other jaw.

FREDERICK LESTER STANTON.